United States Patent
Windisch

Patent Number: 5,666,803
Date of Patent: Sep. 16, 1997

[54] VECTORED THRUST COMPRESSOR FOR REMOTE CONTROLLED AIRCRAFT

[76] Inventor: D. Anthony Windisch, 1438A S. St. Louis, Tulsa, Okla. 74120

[21] Appl. No.: 514,827

[22] Filed: Aug. 14, 1995

[51] Int. Cl.⁶ ........................................................ F02K 1/00
[52] U.S. Cl. ........................................... 60/232; 239/265.25
[58] Field of Search ........................... 60/232, 237, 228, 60/271; 239/265.25, 265.35

[56] References Cited

U.S. PATENT DOCUMENTS

| | | | |
|---|---|---|---|
| 2,912,188 | 11/1959 | Singelmann et al. | 244/12 |
| 3,054,577 | 9/1962 | Wolf et al. | 244/15 |
| 3,056,258 | 10/1962 | Marchant et al. | 60/35.55 |
| 3,088,275 | 5/1963 | Marchant et al. | |
| 3,117,750 | 1/1964 | Snell | 244/23 |
| 3,160,368 | 12/1964 | Young et al. | 244/76 |
| 3,164,337 | 1/1965 | Hooper | 244/12 |
| 3,209,535 | 10/1965 | Marchant et al. | 239/265.25 |
| 3,226,032 | 12/1965 | Kurti | 239/265.25 |
| 3,266,245 | 8/1966 | Mullins | 60/232 |
| 4,519,543 | 5/1985 | Szuminski et al. | 239/265.19 |
| 4,552,309 | 11/1985 | Szuminski et al. | 239/265.19 |
| 4,587,803 | 5/1986 | Nightingale et al. | 60/226.1 |
| 4,782,657 | 11/1988 | Lewis et al. | 60/226.1 |

OTHER PUBLICATIONS

"R/C VTOL Makes History" by John A. Gorham Oct. 1993 starting with p. 38 of Model Airplane News.

Ducted–Fan RC Aircraft by Dick Sarpolus, Kalmbach Publishing, 1981; entire publication enclosed, see p. 12 for tandom fan unit.

*Primary Examiner*—Charles G. Freay
*Attorney, Agent, or Firm*—Head, Johnson & Kachigian

[57] ABSTRACT

A vectored thrust compressor for use in remote controlled aircraft comprising a housing having a forwardly facing air intake is disclosed. Two pair of vectorable thrust nozzles connect to the housing and project from opposite sides of the housing. A first pair is disposed at the forward end of the housing and a second pair is located at the aft end. Each thrust nozzle is adjustable such that the thrust nozzles are rotatable simultaneously by remote control. A first ducted-fan is located in the forward end of the housing and is connected to a drive shaft. A portion of the air flow generated by the first ducted-fan is diverted through the forward pair of thrust nozzles. A second ducted-fan is situated in the aft end of the housing, forward of the second pair of thrust nozzles, and is also connected to the drive shaft. The drive shaft may be turned by a conventional engine.

10 Claims, 5 Drawing Sheets

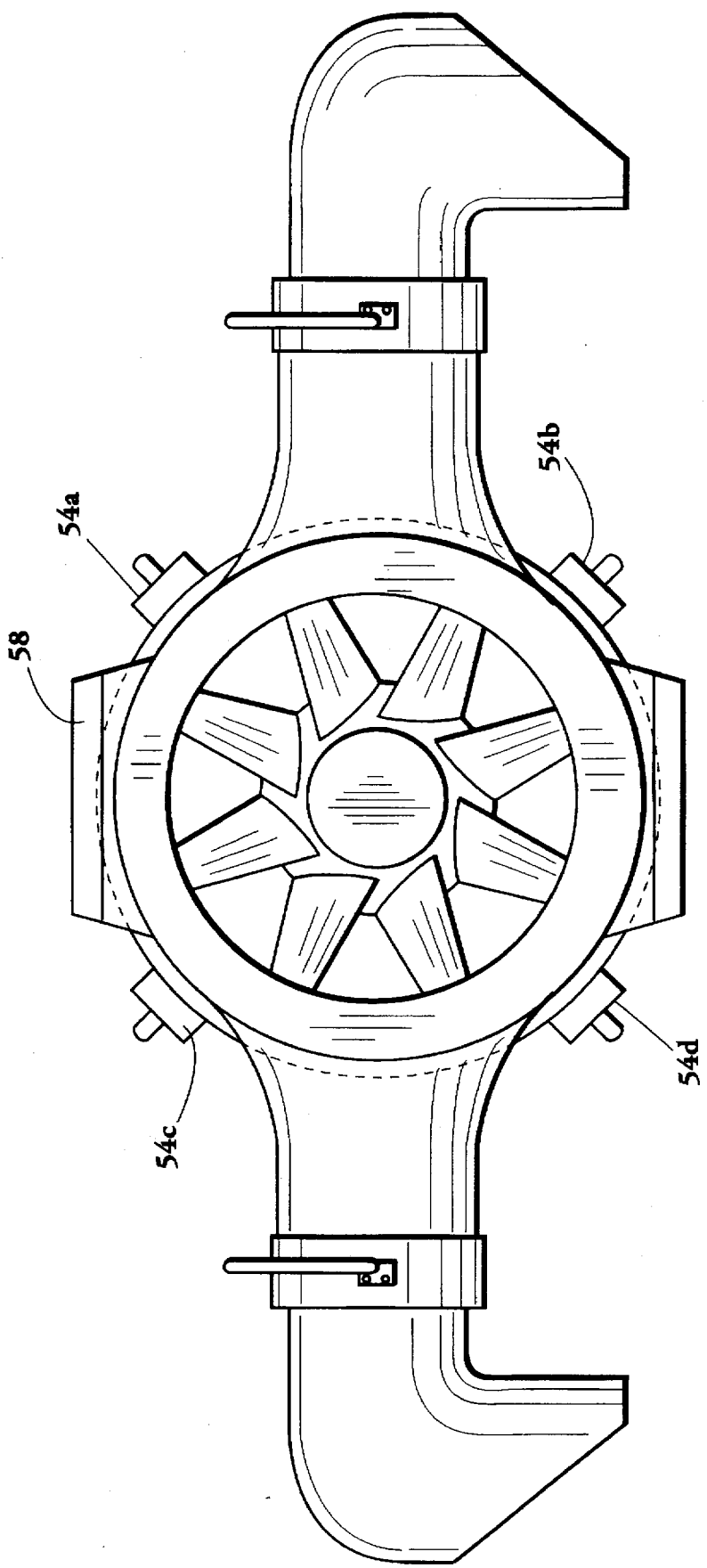

VECTORED THRUST COMPRESSOR FOR REMOTE CONTROLLED AIRCRAFT

BACKGROUND OF THE INVENTION

The advent of the jet age toward the end of World War II brought a new challenge to aircraft modelers—how to simulate jet-powered flight. One early solution included mounting a glow-plug engine in the nose of the model and using a tractor propeller to pull the model through the air. The spinning propeller is invisible in flight and such models perform rather well. Another approach is to use a real "miniaturized" jet engine. However, such engines are generally too difficult for radio-control pilots to manage, as the engines cannot be throttled, are excessively noisy, and create a fire hazard.

By far the most successful approach is to power the model aircraft with a ducted fan driven by a high-speed engine. The engine turns a multi-bladed fan mounted inside a circular housing (the duct), and the fan unit produces thrust which pushes the model through the air. With a ducted fan the entire power plant can be hidden inside most models, thus allowing for the building of realistic replicas of jet aircraft. Further, ducted-fan models have many of the flight characteristics of full-size jet aircraft, offering new challenges to radio-control pilots. An excellent source of background material on ducted-fan aircraft is *Building & Flying Ducted-fan RC Aircraft*, by Dick Sarpolus, published in 1981 by Kalmback Publishing Co.

Almost all important jet powered aircraft have been successfully modeled using ducted-fan systems. The notable exception are aircraft with vertical take-off and landing (VTOL) capability, such as the well-recognized British Harrier "jump" jet. The difficulties in achieving hover to horizontal flight have, for the most part, stymied the developers of lightweight remotely controlled aircraft, and only recently was the chasm from vertical to horizontal flight and back successfully traversed. See *R/C VTOL Makes History*, by John A. Gorham, published in the October 1993 issue of *Model Airplane News*. However, the VTOL radio-controlled aircraft which first successfully navigated transitory flight looks and behaves a far cry from the sleek and stylish Harrier. The Grumman Electronics Systems' ⅓-scale R/C model of a proposed VTOL aircraft utilized twin rotatable, externally mounted ducted-fan engine and fan combinations employing a vane-control system manipulated by flight-control servos. Though conquering transitory flight, the Grumman project did not provide aircraft modelers with a workable R/C power plant for internal mounting in made-to-scale fighter aircraft models.

SUMMARY OF THE INVENTION

It is thus an object of the present invention to provide a lightweight aircraft propulsion system of the ducted-fan variety for use in remotely controlled vertical take-off and landing aircraft wherein the available thrust can be directed downward to produce upward lift or rearward to produce forward propulsion.

It is another object of the invention to provide a ducted-fan propulsion system of simple construction, capable of being internally mounted in the fuselage of a remotely piloted aircraft. In other words, the invention makes possible the made-to-scale modeling of common VTOL turbine-driven fighter aircraft.

It is a further object of the invention to provide a ducted-fan propulsion system as aforesaid which is capable of facilitating a hover and transitory flight and which, when used in remotely controlled aircraft, produces flight characteristics similar to those of full-size turbojet aircraft.

These and other objects and advantages are achieved by providing a vectored thrust compressor possessing a completely modular, complex configuration of fans and air flow deflectors encased in a duct or tube. The present invention includes a housing having a forwardly facing air intake. Two pair of vectorable thrust nozzles are connected to the housing and project from opposite sides of the housing. A first pair is disposed at the forward end of the housing and a second pair is located at the aft end. Each thrust nozzle is adjustable such that the thrust nozzles are rotatable simultaneously by remote control. A first ducted-fan is located in the forward end of the housing and is connected to a drive shaft. A portion of the air flow moving through the first ducted-fan is diverted to the forward pair of thrust nozzles. A second ducted-fan is situated in the aft end of the housing, forward of the second pair of thrust nozzles, and is also connected to the drive shaft. The drive shaft can be turned by any conventional engine means.

In its preferred embodiment, the invention includes a somewhat cylindrical compressor assembly housing having a forwardly facing air intake. The first fan assembly is located within the compressor assembly housing near to the air intake. A spinner protrudes slightly outside the forward end of the unit. A forward stator having turbine-like support vanes is positioned behind the first fan assembly for aiding in air flow control and for internally supporting the compressor assembly housing. The first pair of adjustable directional thrust nozzles is located behind the forward stator, each nozzle being adapted to connect to the compressor assembly housing on opposite sides thereof. A ring deflector is disposed between the first pair of thrust nozzles. The ring deflector is slightly curved and has an open center, a lip extending from its outer edge toward its center, and guide vanes located adjacent to the first pair of thrust nozzles. The guide vanes function to help direct an air flow through the first pair of thrust nozzles. A diffuser is situated behind the ring deflector, the diffuser being cone-shaped and having its smaller end contiguous to the ring deflector and its larger end equal in diameter to the casing. A rear stator, similar in design to the forward stator, is positioned behind the diffuser. A second fan assembly is located in back of the rear stator and provides an air flow to a second pair of thrust nozzles disposed at the aft end of the compressor assembly housing. The second pair of thrust nozzles are, like the first pair, arranged on opposite sides of the compressor assembly housing. A drive shaft housed in an elongate drive shaft enclosure connect to the first and second fan assemblies. Any conventional engine, from two-stroke to rotary, can be used to turn the drive shaft.

A better understanding of the invention, and the objects thereof, will be obtained from the following description, taken in conjunction with the attached drawings.

BRIEF DESCRIPTION OF THE DRAWINGS

FIG. 5 is a front view of the preferred embodiment of the invention taken along line 5—5 of FIG. 3.

FIG. 6b is a top view of the ring deflector component taken along line 6b—6b of FIG. 6a.

DETAILED DESCRIPTION OF THE PREFERRED EMBODIMENT

Figure 1:
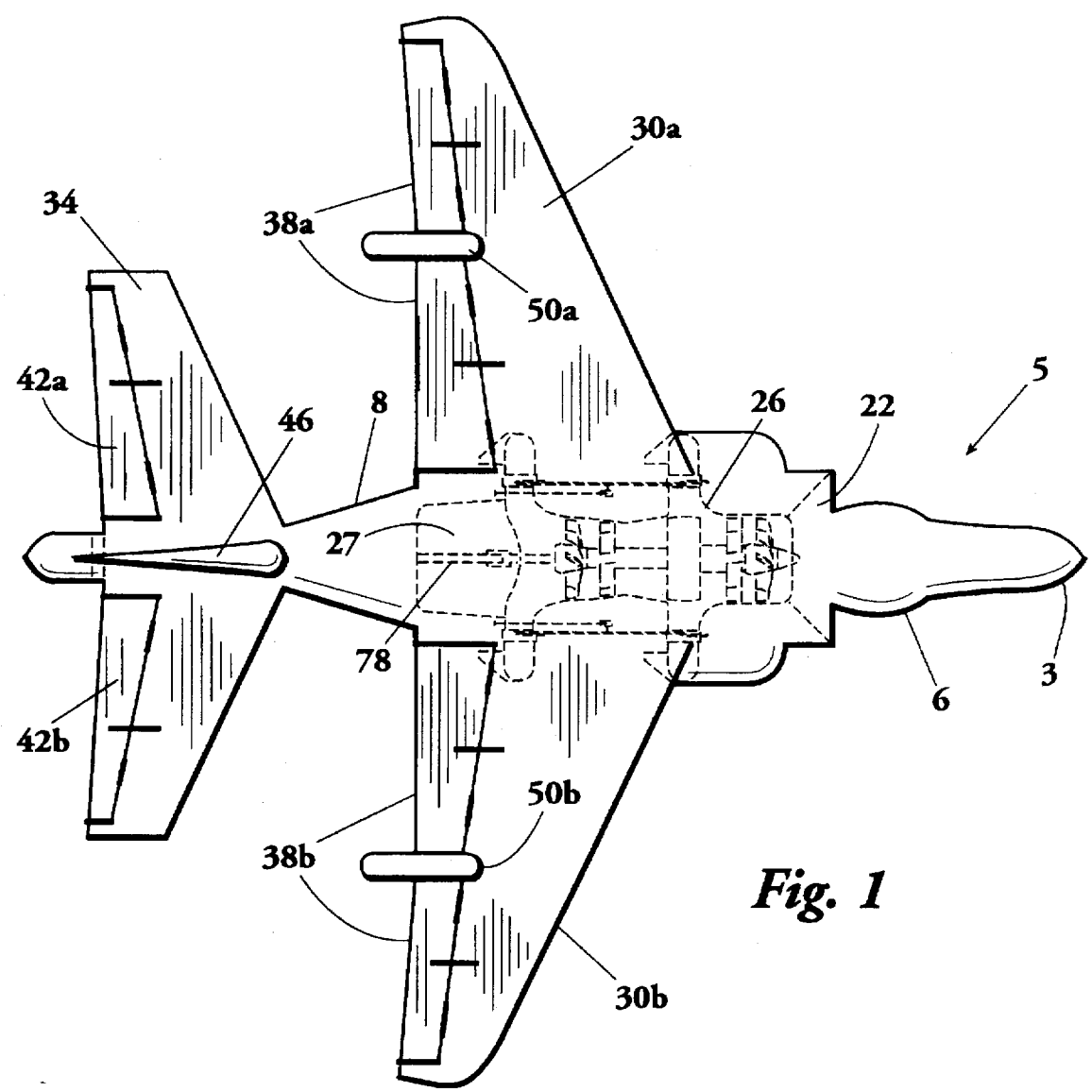
FIG. 1 is a top plan view of the preferred embodiment of the invention as installed in a made-to-scale aircraft model.

Referring to FIG. 1, the element number 5 generally shows a made-to-scale fighter aircraft model. Aircraft 5 includes nose 3 which is forward of cockpit 6. Projecting out from fuselage 8 are main wings 30a–b. At the trailing edge of main wings 30a–b are ailerons 38a–b. Ailerons 38a–b function to impart a rolling motion to aircraft 5 and, thus, provide for lateral control. Main wings 30a–b are also provided with retractable landing gear shrouds 50a–b. Elevator wing 34, along with elevator flaps 42a–b and rudder 46, provide for further flight control.

Positioned within fuselage 8 of aircraft 5 is compressor assembly housing 26. Compressor assembly housing 26 is slightly smaller than the airframe of aircraft 5 and has a forwardly facing air intake. Aircraft 5 allows for an air flow to compressor assembly housing 26 through a compressor/engine air intake 22. Intake 22 can be extended and suction doors (not shown) can be added to increase the air mass drawn into compressor assembly housing 26 during transitional flight and hover. In back of compressor assembly housing 26 is engine enclosure 27. Any conventional high-power modeling engine, piston or rotary, may be used to power the present invention. Whatever engine is used, it is coupled to drive shaft 78.

Figure 2:
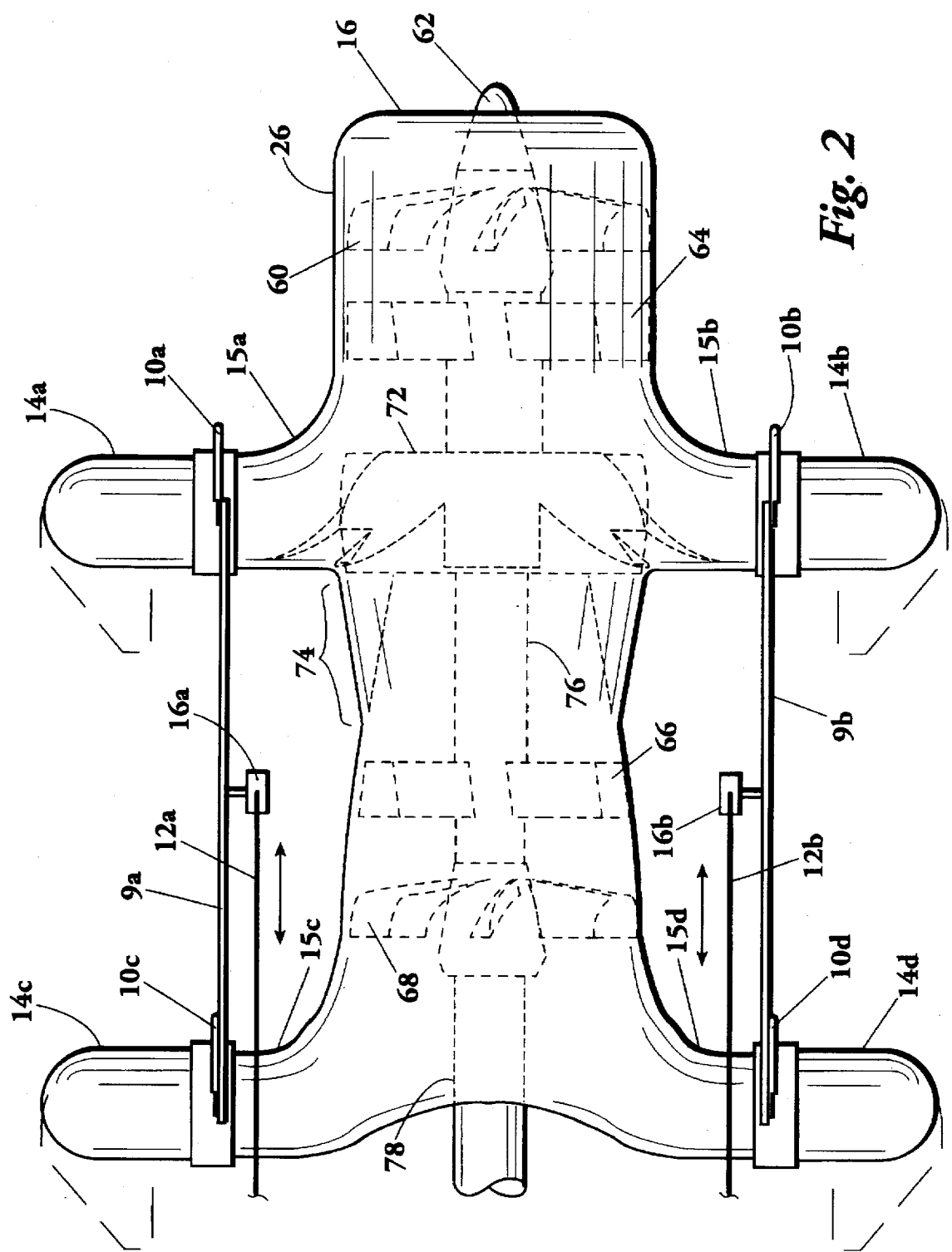
FIG. 2 is a top plan view of the preferred embodiment of the invention.
Figure 3:
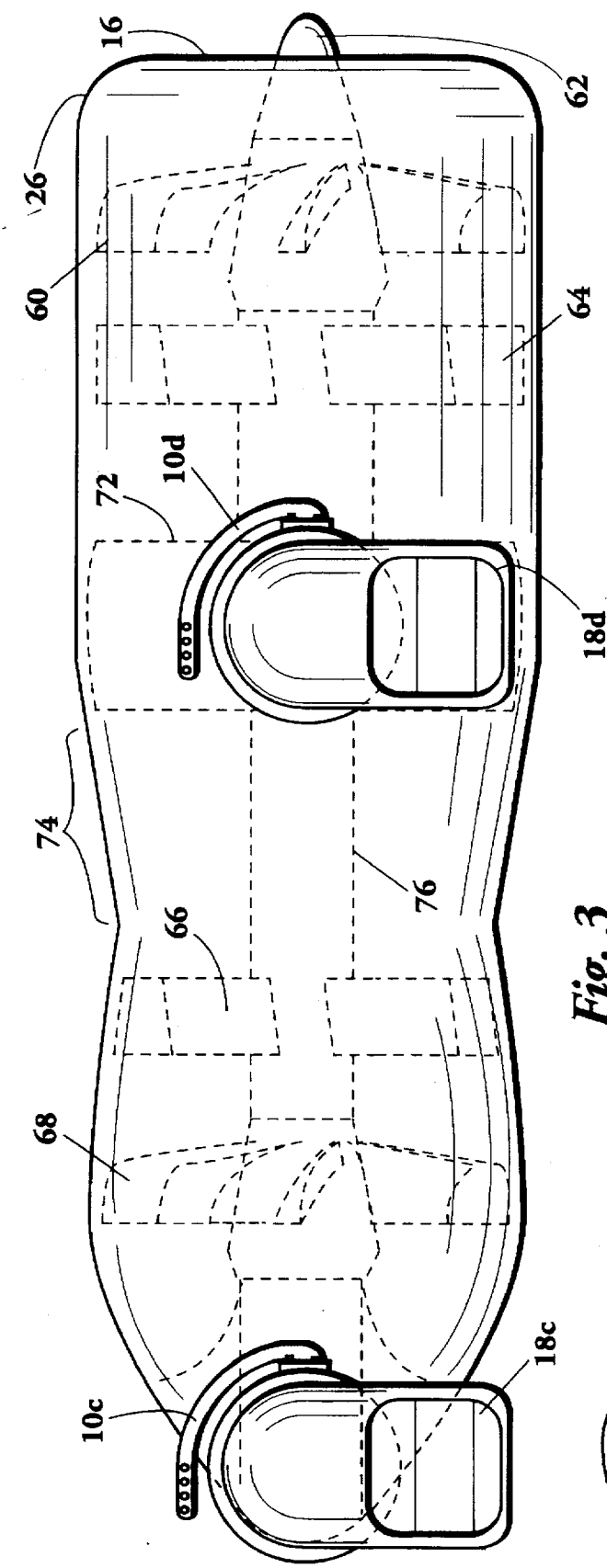
FIG. 3 is a side elevational view of the preferred embodiment of the invention.

Referring now to FIGS. 2 and 3, the vectored thrust compressor of the preferred embodiment of the invention is shown. A first fan assembly 60 is located within compressor assembly housing 26 near to air intake 16. A spinner 62 is attached to fan assembly 60 and revolves with it. Spinner 62 protrudes slightly outside the forward end of compressor assembly housing 26. A forward stator 64 having turbine-like support vanes is positioned behind first fan assembly 60. Forward stator 64 aids in air flow control and internally supports compressor assembly housing 26 and fan drive shaft enclosure.

Still with respect to FIGS. 2 and 3, compressor assembly housing 26 is cast to provide two opposing pair of exhaust ports 15a–d. A first pair of exhaust ports 15a–b is located behind forward stator 64. A second pair 15c–d is disposed at the aft end of compressor assembly housing 26. A first pair of adjustable directional thrust nozzles 14a–b are located in back of forward stator 60. Thrust nozzles 14a–b are adapted to connect to the first pair of exhaust ports 15a–b, respectively, on opposite sides of compressor assembly housing 26. A means for diverting a portion of an air flow generated by first fan assembly 60 through the first pair of thrust nozzles 14a–b is provided.

In the preferred embodiment of the invention the diverting means comprises a ring deflector 72. The ring deflector 72 works to divide an air mass into three direct air flows. The first and second air flows are vectored 90° from the original air mass flow direction horizontally to the sides of compressor assembly housing 26 and through the first pair of thrust nozzles 14a–b. The third air flow is subjected to Bernoulli's principle of vacuum induction due to the shape of the ring deflector 72. This air mass is then used as a feeder supply for the second fan assembly 68.

The ring deflector 72 has an internal vacuum supplement air port to provide a secondary vacuum-thrust generating assembly behind its horizontal thrust deflectors. This air flow is pressurized with the first and second air flows to provide the necessary thrust build up for vertical take off and landing.

Figure 6B:
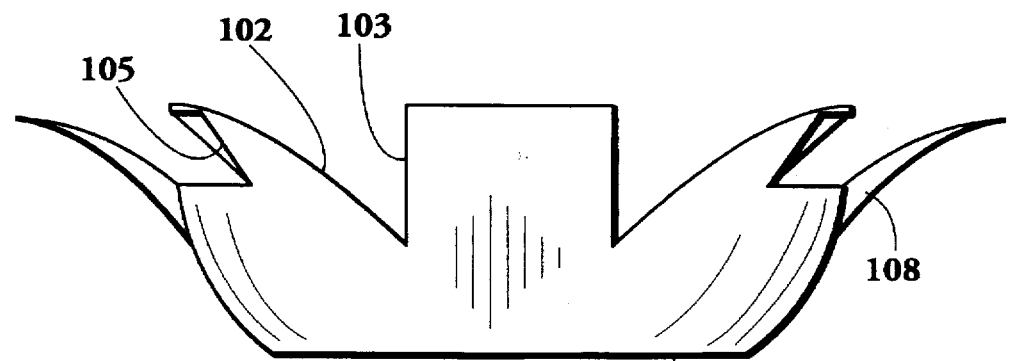
Figure 6A:
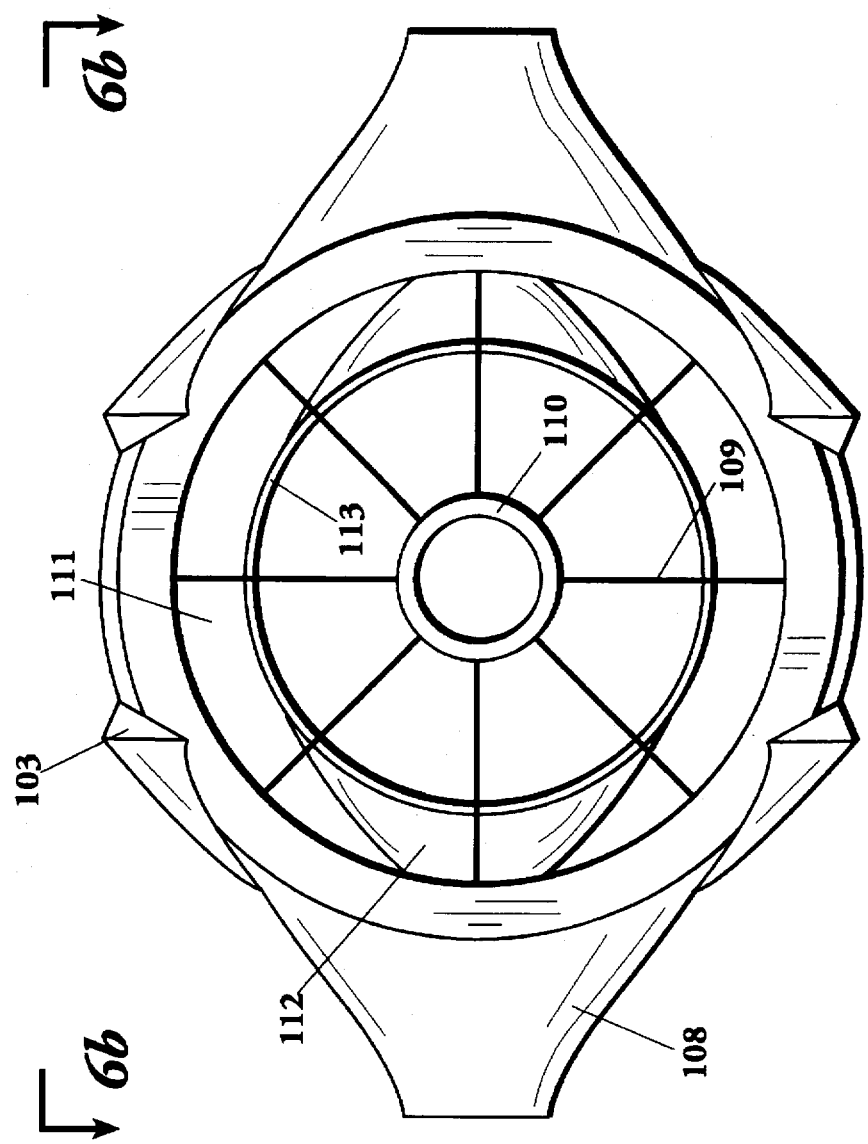
FIG. 6a is a front view of the ring deflector component of the preferred embodiment of the invention.
Figure 6C:
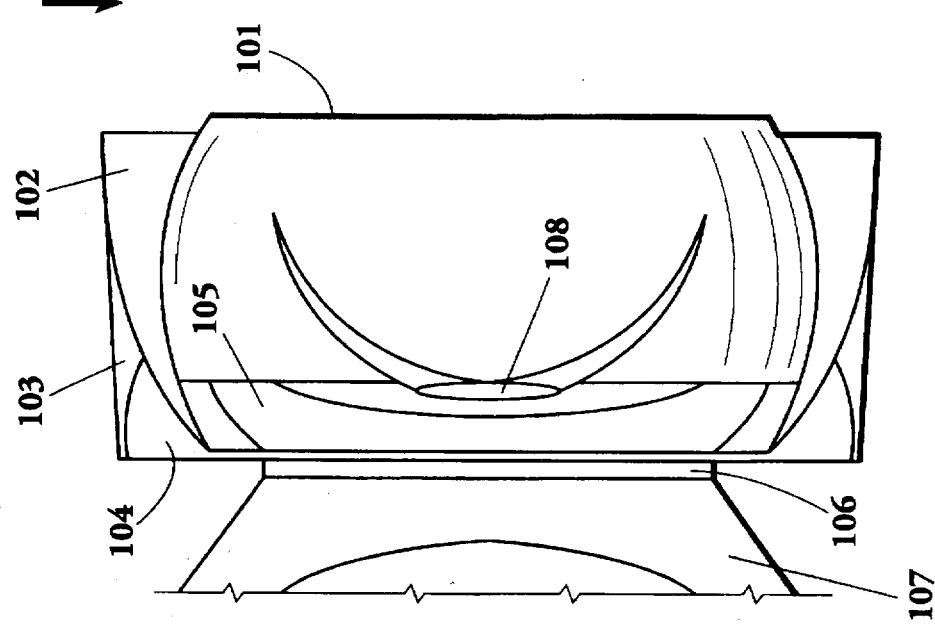
FIG. 6c is side view of the ring deflector component.

Turning for a moment to FIGS. 6a, 6b and 6c, the ring deflector 72 of the preferred embodiment of the invention is shown. Element number 101 indicates the front air intake of the ring deflector 72. The ring deflector rim or casing itself is indicated by the numeral 102. Extending from the deflector ring rim 102 on each side of the ring deflector 72 are horizontal thrust deflectors 108. Internal horizontal ring deflectors 112 are also provided, as is an internal ring vacuum exhaust shroud 111. The element 103 identifies a center pitch/yaw intake. An internal ring vacuum exhaust port is indicated by the numeral 105, and an internal ring vacuum intake is shown where indicated at 109. Centered in the ring deflector 72 is a drive shaft casing 110.

Still with respect to the ring deflector 72, a diffuser 107 is connected to the ring deflector 72 by a deflector/diffuser coupling 106 and a diffuser intake coupling 113. The ring deflector 72 generates a vacuum due to its configuration, and particularly the configuration identified by the numeral 104.

In back of the ring deflector 72 is a diffuser 74. The diffuser 74 is formed, in part, by the inner wall of compressor assembly housing 26 and is generally of a cone-shaped, tapered construction. The smaller end of diffuser 74 is contiguous to ring deflector 72. The diffuser 74 and ring deflector 72 work as a venturi, increasing the velocity of the air flow through compressor assembly housing 26 and creating a vacuum between the two fans. The venturi effect of diffuser 74 and ring deflector assembly 72 is augmented in forward flight by the ram effect.

A rear stator 66, also having turbine-like support vanes, is positioned behind the diffuser 74 at a point where compressor assembly housing 26 begins to slightly increase in diameter. A second fan assembly 68 is located in back of rear stator 66. The air flow passing back from the second fan assembly 68 is directed out a second pair of adjustable directional thrust nozzles 14c–d disposed at the aft end of compressor assembly housing 26. Like their counterparts thrust nozzles 14a–b, thrust nozzles 14c–d are each adapted to connect to aft exhaust ports 15c–d on opposite sides of compressor assembly housing 26. Thrust nozzle vanes 18 may be supplied to better direct the air exiting from thrust nozzles 14a–d into supporting thrust columns.

A means for simultaneously rotating thrust nozzles 14a–d by remote control is supplied. As shown in FIG. 2, the preferred embodiment of the invention includes four actuating arms 10a–d which are connected, respectively, to thrust nozzles 14a–d. The actuating arms on each side of compressor assembly housing 26 are coupled to a thrust nozzle synchronization rod, i.e. actuating arms 10a and 10c are coupled to synchronization rod 9a and actuating arms 10b and 10d are coupled to synchronization rod 9b. Synchronization rods 9a–b are each connected to an actuation control harness 16a–b controlled through two activation control wires 12a–b. Activation control wires 12a–b are remotely manipulated via a servo and, when engaged, function to regulate the simultaneous rotation of thrust nozzles 14a–d.

Drive shaft 78 is coupled to first fan assembly 60 and second fan assembly 68 and extends into engine enclosure 27 where it is adapted to connect to an appropriate gas powered piston or rotary engine. Mounting the engine outside streamlined compressor assembly housing 26 allows for optimum performance. Control of the revolutions per minute of the engine is by a remote servo of the type which is customarily available off the shelf. Drive shaft 78 is housed in an elongate drive shaft enclosure 76 which extends from first fan assembly 60 rearward to the second fan assembly 68. Forward stator 64, ring deflector 72, and rear stator 66 are each adapted to accommodate and support drive shaft enclosure 76. Besides housing drive shaft 78, drive shaft enclosure 76 functions to reduce the air flow area through compressor assembly housing 26 and to help gain control over, and to streamline, the air flow. Both first fan assembly 60 and second fan assembly 68 are connected to drive shaft 78 by bearing and race assemblies. Drive shaft 78 passes through the aft end of compressor assembly housing 26 via another bearing and race assembly where it is mated to a U-joint. The engine drive shaft will as well be coupled to a U-joint and connected to drive shaft 78.

Figure 4:
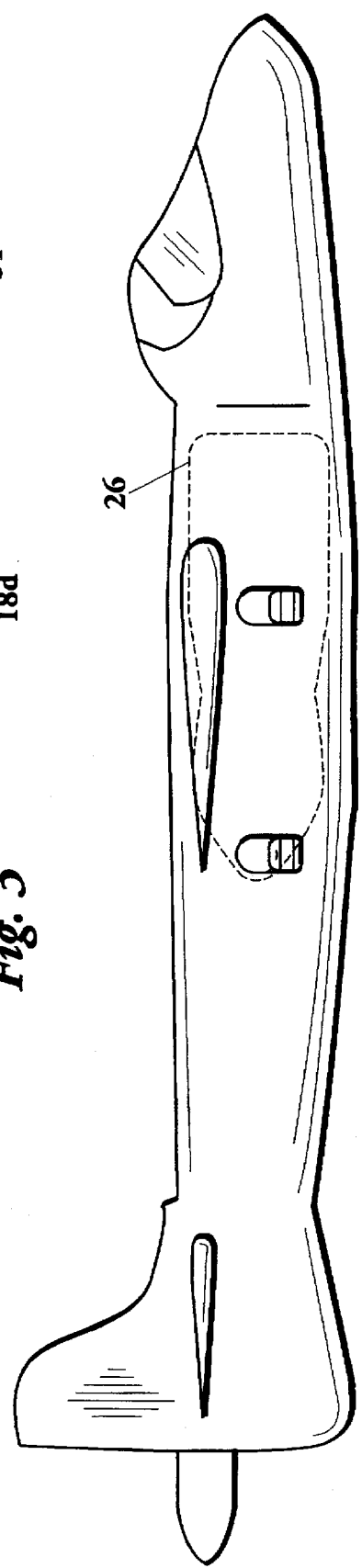
FIG. 4 is a side plan view of the invention as installed in a made-to-scale aircraft model.

Turning to FIG. 4, the focus is on the spatial relation of the vectored thrust compressor of the present invention to aircraft 5. As shown, compressor assembly housing 26 is only slightly smaller than the airframe of aircraft 5. As the amount of thrust generated by the present invention is directly proportional to the volumetric capacity of compressor assembly housing 26, all available space in fuselage 8 should be used to accommodate the largest vectored thrust compressor possible. Consequently, compressor assembly housing 26 and the component parts of the present invention may be suitably scaled as required to provide the thrust necessary to operate aircraft of varying weights and dimensions.

FIG. 5 reveals that the engine is mounted to compressor assembly housing 26 via a plurality of rear assembly mounts 54a–d. Assembly mounts 54a–d are squared and threaded to accept mounting bolts. Also shown is a bleed system 58 for facilitating hover and pitch/yaw control.

The vectored thrust compressor is self-contained, modular, and when in use, pressurized. The engine and compressor, as a unit, should have a center of gravity between the first and second pairs of thrust nozzles along the drive shaft axis, halfway between the center point of the unit and the rear thrust nozzle assembly.

To utilize the present invention, the aircraft modeler, taking into account the weight and dimensions of the model aircraft, selects a vectored thrust compressor of suitable size. The vectored thrust compressor is installed in the fuselage of the aircraft and is connected to an appropriate engine by way of assembly mounts 54a–d. The engine is planted in the engine enclosure 27 and is connected to drive shaft 78 via a U-Joint. After proper assembly, the remote pilot starts the engine with thrust nozzles 14a–d directed downward toward the ground. As the engine speed is increased, the amount of thrust produced by the invention is increased. When the amount of thrust produced by the vectored thrust compressor exceeds the weight of the aircraft, the aircraft will slowly rise vertically into the air. Via activation control wires 12a–b, the remote pilot then initiates the rotation of directional thrust nozzles 14a–d rearward toward the aft of the aircraft to establish transitory flight into a forward bearing. To land, the remote pilot causes a slow downward rotation of thrust nozzles 14a–d. When hover is achieved, engine speed is decreased such that the aircraft sinks gently toward the ground.

Though the vectored thrust compressor utilizes ducted-fans, it draws on some basic turbine principles—the first being the venturi effect and the second being the ram effect. In addition, compressor assembly housing 26 and ring deflector 72 are designed to force an air flow into a vacuum creating configuration which, in forward flight, would be amplified by the venturi effect of diffuser 74 and the ram effect of on-rushing air into a saturated air flow.

As for its flow configuration, at air intake 16 an air flow is divided from an air mass. The air flow expands along the inner wall of compressor assembly housing 26 under the beginning forces of the venturi and ram effects as well as the induction pressures of first fan assembly 60. The air flow is drawn through first fan assembly 60 and is then pushed through forward stator 64 and its turbine-like support vanes into the ring deflector area. Under pressure, the air flow is divided into three parts by ring deflector 72. A first air mass on the inner wall of compressor assembly housing 26 is forced by the housing and ring deflector 72 into the first pair of thrust nozzles 14a–b. A portion of the air flow through the center of ring deflector 72 is also vented out and into thrust nozzles 14a–b. The remainder of the air flow through the center of ring deflector 72 enters diffuser 74 where it expands to create a vacuum. This forms a low pressure area just before second fan assembly 68, which is fed by first fan assembly 60. In essence, the compressor is continually starving for air. It is this tension which generates the required air mass for second fan assembly 68. Second fan assembly 68 creates a suction and draws in an air mass under pressure, then forces the air mass into the second pair of thrust nozzles 14c–d. The amount of air mass the compressor can compress is only restricted by the size of the fans, housing and materials used for construction. Plastic or fiberglass can be used to form compressor assembly housing 26 and the component parts of the compressor, and off the shelf fans can be incorporated into the design.

Thus, there is provided by the present invention an aircraft propulsion system of the ducted-fan variety for use in remotely controlled VTOL aircraft wherein thrust can be directed downward to produce upward lift sufficient to vertically raise the aircraft or rear-ward to produce forward propulsion. The invention is of a modular, simple construction and is capable of being internally mounted in the fuselage of a remotely piloted aircraft, making possible the made-to-scale modeling of common VTOL fighter aircraft. The invention is also a high performance apparatus producing flight characteristics similar to those of full-size turbojet aircraft.

In essence, the vectored thrust compressor disclosed and claimed herein develops thrust in a manner which uses turbine design considerations applied to a ducted-fan configuration. However, instead of relying upon internal turbine combustion and heat expansion to develop thrust, the present invention creates thrust through the use of a small high-powered, externally mounted engine adapted to drive dual ducted-fans configured to derive a maximum of thrust without heat or fire. The vectored thrust compressor is developed for remote control aircraft so that a ducted-fan version of the Harrier or an AV8-A can be produced for hobbyists and enthusiasts. Since size and weight are important factors in model aircraft performance, the compressor is designed to be constructed out of a lightweight plastic or fiberglass. Furthermore, since it develops thrust without the ignition of fuel, the present invention is safe to operate and is relatively environmentally friendly.

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A vectored thrust compressor, comprising:
   (a) a first ducted-fan;
   (b) a first pair of adjustable directional thrust nozzles arranged opposingly behind said first ducted-fan;
   (c) means for diverting a portion of an air flow through said first pair of thrust nozzles;
   (d) a second ducted-fan;
   (e) a second pair of adjustable directional thrust nozzles arranged opposingly behind said second ducted-fan;
   (f) means for simultaneously rotating said thrust nozzles by remote control; and
   (g) a drive shaft connected to said first and second ducted-fans.

2. A vectored thrust compressor, comprising:
   (a) a compressor assembly housing having a forwardly facing air intake;
   (b) a first fan assembly;
   (c) a first pair of adjustable directional thrust nozzles disposed behind said first fan assembly, each nozzle adapted to connect to said compressor assembly housing on opposite sides thereof;
   (d) means for diverting a portion of an air flow through said first pair of thrust nozzles;
   (e) a second fan assembly;
   (f) a second pair of adjustable directional thrust nozzles disposed behind said second fan assembly, each nozzle adapted to connect to said compressor assembly housing on opposite sides thereof;
   (g) means for simultaneously rotating said thrust nozzles by remote control; and
   (h) a drive shaft connected to said first and second fan assemblies.

3. The vectored thrust compressor according to claim 2, further comprising forward and aft stators having turbine-like support vanes for aiding air flow control and for internally supporting said compressor assembly housing.

4. The vectored thrust compressor according to claim 2, further comprising a diffuser located behind said diverting means and formed by the inner wall of said compressor assembly housing, said diffuser being cone-shaped and having its smaller end contiguous to said diverting means.

5. The vectored thrust compressor according to claim 2, further comprising an engine connected to said drive shaft.

6. The vectored thrust compressor according to claim 2 wherein said diverting means comprises a ring deflector disposed between said first pair of thrust nozzles, said ring deflector being slightly curved, having an open center, having a lip extending from its outer edge toward its center, and having guide vanes located adjacent to said first pair of thrust nozzles for directing an air flow through said first pair of thrust nozzles.

7. The vectored thrust compressor according to claim 2 wherein said means for simultaneously rotating said thrust nozzles comprises four actuating arms, each coupled to one of said thrust nozzles, said actuating arms also being connected, as the case may be, to a left or right thrust nozzles synchronization rod, said synchronization rods each being connected to a control harness which is, in turn, connected to a remotely controlled thrust activation control wire.

8. The vectored thrust compressor according to claim 2 wherein said drive shaft is positioned within an elongate drive shaft housing.

9. A vectored thrust compressor, comprising:
   (a) a compressor assembly housing having a forwardly facing air intake;
   (b) a first fan assembly located within said compressor assembly housing near to said air intake;
   (c) a forward stator having turbine-like support vanes and located behind said first fan assembly for aiding air flow control and for internally supporting said compressor assembly housing;
   (d) a first pair of adjustable directional thrust nozzles disposed behind said forward stator, each nozzle adapted to connect to said compressor assembly housing on opposite sides thereof;
   (e) a ring deflector disposed between said first pair of thrust nozzles, said ring deflector being slightly curved, having an open center, having a lip extending from its outer edge toward its center, and having guide vanes located adjacent to said first pair of thrust nozzles for directing an air flow through said first pair of thrust nozzles;
   (f) a diffuser located behind said thrust vectoring assembly formed by the walls of said compressor assembly housing, said diffuser being cone-shaped and having its larger end contiguous to said ring deflector;
   (g) a rear stator having turbine-like support vanes and positioned behind said diffuser for aiding air flow control and for internally supporting said compressor assembly housing;
   (h) a second fan assembly located behind said rear stator;
   (i) a second pair of adjustable directional thrust nozzles disposed at the aft end of said compressor assembly housing behind said second fan assembly, each nozzle adapted to connect to said compressor assembly housing on opposite sides thereof;
   (j) means for simultaneously rotating said thrust nozzles by remote control; and
   (k) a drive shaft coupling said first and second fan assemblies and housed in an elongate drive shaft enclosure.

10. In a remotely controlled aircraft, a vertical take-off and landing propulsion system, comprising:
   (a) a compressor assembly housing having a forwardly facing air intake;
   (b) a first fan assembly;
   (c) a first pair of adjustable directional thrust nozzles disposed behind said first fan assembly, each nozzle adapted to connect to said compressor assembly housing on opposite sides thereof;
   (d) means for diverting a portion of an air flow through said first pair of thrust nozzles;
   (e) a second fan assembly;
   (f) a second pair of adjustable directional thrust nozzles disposed behind said second fan assembly, each nozzle adapted to connect to said compressor assembly housing on opposite sides thereof;
   (g) means for simultaneously rotating said thrust nozzles by remote control; and
   (h) a drive shaft connected to said first and second fan assemblies;
   (i) an engine connected to said drive shaft.

* * * * *